(12) United States Patent
Hayasaka (10) Patent No.: US 6,301,909 B1
(45) Date of Patent: Oct. 16, 2001

(54) AUTOMOTIVE DUAL AIR-CONDITIONING SYSTEM

(75) Inventor: Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/709,849

(22) Filed: Nov. 10, 2000

(30) Foreign Application Priority Data

Nov. 22, 1999 (JP) .................................................. 11-331839

(51) Int. Cl.[7] .............................. F25B 7/00; F25B 27/00
(52) U.S. Cl. ........................................... 62/175; 62/323.3
(58) Field of Search ........................... 62/175, 244, 510, 62/323.3; 165/203; 236/51, 1 B (56) References Cited

U.S. PATENT DOCUMENTS

| | | | |
|---|---|---|---|
| 5,647,223 | * 7/1997 | Wada et al. | ............................. 62/175 |
| 5,715,997 | * 2/1998 | Ito et al. | ................................ 236/1 B |
| 5,729,989 | * 3/1998 | Sunaga et al. | ......................... 62/126 |
| 5,746,060 | * 5/1998 | Sunaga et al. | ......................... 62/126 |
| 5,765,383 | 6/1998 | Inoue . | |
| 5,803,166 | * 9/1998 | Ito et al. | ............................... 165/203 |

* cited by examiner

*Primary Examiner*—William Doerrler
(74) *Attorney, Agent, or Firm*—Brinks Hofer Gilson & Lione (57) ABSTRACT

An automotive dual air-conditioning system having No. 1 air conditioner and No. 2 air conditioner arranged separately in an automobile, for controlling air-conditioning operation, and a bus line connected between No. 1 air conditioner and No. 2 air conditioner. No. 1 air conditioner transfers air-conditioner control information to No. 2 air conditioner through the bus line during operation of No. 1 air conditioner and No. 2 air conditioner, to thereby control the operating condition of No. 2 air conditioner in accordance with the information thus supplied. Furthermore, No. 2 air conditioner changes the control of its operating condition to manual control in case a communication error of air-conditioner control information to be transferred through the bus line continues over a specific period of time.

3 Claims, 6 Drawing Sheets

AUTOMOTIVE DUAL AIR-CONDITIONING SYSTEM

BACKGROUND OF THE INVENTION

1. Field of the Invention

The present invention relates to an automotive dual air-conditioning system and, more particularly, to a dual air-conditioning system for an automobile in which two sets of air conditioners are arranged, and the operating condition of one air conditioner and the other air conditioner can be controlled simultaneously by controlling the one air conditioner.

2. Description of Related Art

In some types of automobiles, a conventional automotive air-conditioning system adopted is a so-called dual air-conditioning system which includes No. 1 air conditioner located at the front part and No. 2 air conditioner at the rear part. In the automotive dual air-conditioning system, No. 1 air conditioner and No. 2 air conditioner are connected by a bus line. It is possible not only to set the operating condition of No. 1 air conditioner by controlling the operating condition of No. 1 air conditioner by means of various control buttons arranged on a No. 1 air conditioner control panel but to set the operating condition of No. 2 air conditioner according to air-conditioner control information supplied to No. 2 air conditioner through the bus line from No. 1 air conditioner.

No. 1 air conditioner used in the automotive dual air-conditioning system has a control panel, on which temperature setting button, air volume (fan) control button, air outlet select button, outside/inside air changeover button, auto/manual changeover button, and No. 2 air conditioner manual setting button. No. 2 air conditioner has, on its control panel, a temperature setting control unit, air volume (fan) control unit, and air outlet section button. In this case, No. 2 air conditioner manual setting button located on the control panel for No. 1 air conditioner is usually set in OFF position. In this OFF state, the operating condition of No. 2 air conditioner is set so as to be in the same condition as No. 1 air conditioner as previously stated. On the other hand, when No. 2 air conditioner manual setting button is in ON position, the operating condition of No. 2 air conditioner is set to an operating condition according to control on No. 2 air conditioner side, that is, regardless of the control of No. 1 air conditioner.

In such a known automotive dual air-conditioning system, the condition of operation control of No. 1 and No. 2 air conditioners can be controlled simultaneously by controlling the air-conditioner operation control unit of No. 1 air conditioner side. Therefore, there will occur no different setting between the condition of operation control of No. 1 air conditioner and the condition of operation control of No. 2 air conditioner, thereby enabling to prevent a mismatch between the controlled condition of the air conditioner at the front and that of the air conditioner at the rear, giving no discomfort to the driver of the automobile. In addition, since No. 1 and No. 2 air conditioners are controlled to the same condition, it is possible to dispense with time and labor for separately controlling the operating condition of No. 1 and No. 2 air conditioners.

According to the aforementioned known automotive dual air-conditioning system, No. 2 air conditioner can be set to the same condition of operation as No. 1 air conditioner as described above if No. 1 and No. 2 air conditioners are being properly controlled and the bus line for transferring information about air-conditioner control is normally functioning. However, in the event of a communication error of the bus line between No. 1 and No. 2 air conditioners because of trouble arising with the bus line for some reason, the information about the air-conditioner control cannot be properly transferred from No. 1 air conditioner to No. 2 air conditioner via the bus line. Thereafter, therefore, it becomes impossible to properly set the condition of operation of No. 2 air conditioner.

The known automotive air-conditioning system described above is usually so designed that, in case proper transfer of information about air-conditioner operation control to NO. 2 air conditioner has failed, No. 2 air conditioner will be set to a condition of air-conditioner operation in accordance with a normal air-conditioner control information received last. In No. 2 air conditioner, therefore, if the normal air-conditioner control information received last is the air-conditioner control information fed from No. 1 air conditioner and is not affected by control from the control panel of No. 2 air conditioner, No. 2 air conditioner cannot be controlled by any switch or button on the control panel of No. 2 air conditioner. This uncontrollable state will continue until removal of the bus line trouble and recovery from the communication error in information transfer through the bus line. Then, in case the operating condition of No. 2 air conditioner has become uncontrollable, the setting of the operating condition of No. 1 air conditioner will be not enough to control the inside temperature of the automobile, giving much discomfort to a passenger and the driver as well.

SUMMARY OF THE INVENTION

In view of the above-described technological background, it is an object of the present invention to provide an automotive dual air-conditioning system capable of self-controlling the operating condition of No. 2 air conditioner in case of consecutive communication errors of operation control information to be transferred to No. 2 air conditioner from No. 1 air conditioner through the bus line.

To accomplish the object, the automotive dual air-conditioning system of the present invention has No. 1 air conditioner and No. 2 air conditioner arranged separately in the automobile, for controlling air-conditioning operation in the automobile, and a bus line connected between No. 1 air conditioner and No. 2 air conditioner. During operation of No. 1 air conditioner and No. 2 air conditioner, No. 1 air conditioner transfers air-conditioner control information to No. 2 air conditioner through the bus line, to thereby control the operating condition of No. 2 air conditioner in accordance with the information thus supplied. Also, No. 2 air conditioner changes the control of its operating condition to manual control in case a communications error of air-conditioner control information to be transferred through the bus line continues over a specific period of time.

According to the above-described constitution, in the event the transfer of information about normal air-conditioner control to No. 2 air conditioner through the bus line fails because of occurrence of trouble with the bus line connected between No. 1 air conditioner and No. 2 air conditioner, No. 2 air conditioner instantly changes its air-conditioning condition to enable manual control. Therefore it becomes possible to consecutively control the operating condition of No. 2 air conditioner, without giving much driving discomfort in case of a failure in temperature control in the automobile.

Furthermore, the automotive dual air-conditioning system of the present invention is preferred to be of such a constitution that No. 1 air conditioner be located at the front part inside of the automobile, while No. 2 air conditioner is located at the rear part inside of the automobile.

According to the above-described constitution, No. 1 and No. 2 air conditioners can be arranged in the best balance in the automobile and in addition the driver can directly operate the control panel of No. 1 air conditioner located at the front part, thereby providing a high-controllability automotive dual air-conditioning system.

Furthermore, it is preferable that the automotive dual air-conditioning system of the present invention be so constituted that a light-emitting device arranged on the control panel of No. 2 air conditioner blinks in case a communication error of air-conditioner control information continues over a specific period of time.

In case it has become impossible to control the operating condition of No. 2 air conditioner from No. 1 air conditioner because of the above-described constitution, a rear seat occupant can instantly see when it is necessary to operate control members on the control panel when controlling the operating condition of No. 2 air conditioner.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Referring to the accompanying drawings, preferred embodiments of an automotive dual air-conditioning system according to the present invention will be described.

Figure 1:
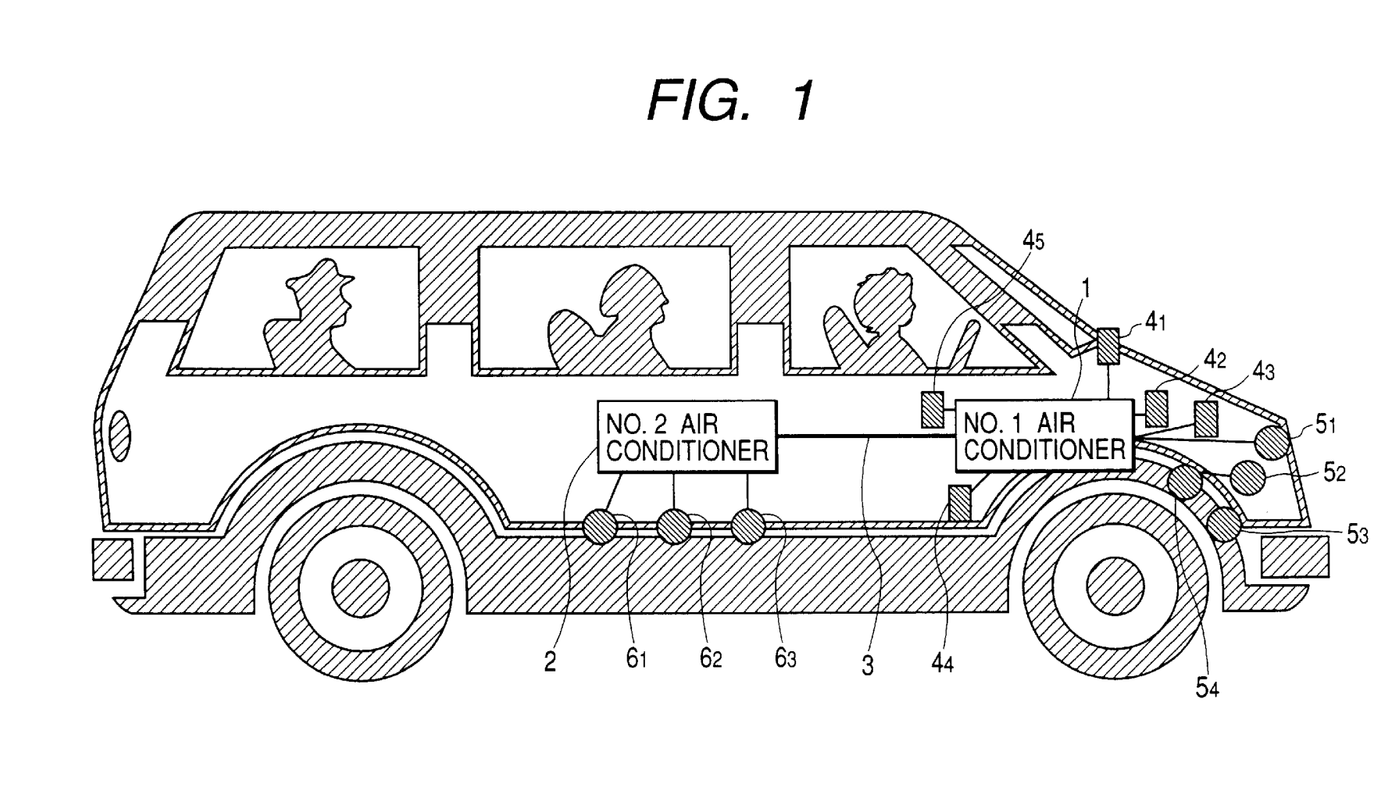
FIG. 1 is a block diagram showing an automotive dual air-conditioning system embodying the present invention mounted in an automobile.

FIG. 1 is a block diagram showing an automotive dual air-conditioning system embodying the present invention mounted in an automobile.

The automotive dual air-conditioning system, as shown in FIG. 1, comprises No. 1 air conditioner 1 located at the front part in the automobile, No. 2 air conditioner 2 located at the rear part in the automobile, and a bus line 3 connected between No. 1 air conditioner 1 and No. 2 air conditioner 2. To No. 1 air conditioner are connected a plurality of (five in this example) temperature sensors $4_1$, $4_2$, $4_3$, $4_4$ and $4_5$ located at the front part of the automobile; and a plurality of (four in this example) of motors $5_1$, $5_2$, $5_3$ and $5_4$ are connected to control members related with No. 1 air conditioner. On the other hand, to No. 2 air conditioner are connected a plurality of (three in this example) motors $6_1$, $6_2$ and $6_3$ which drive the control members related with No. 2 air conditioner.

Figure 2A:
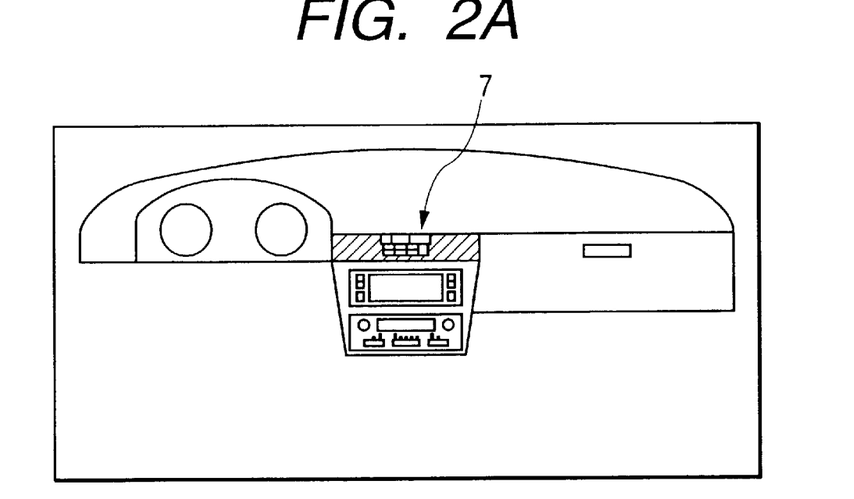
FIG. 2A is a front view showing a control panel incorporated in a front panel of the automobile for No. 1 air conditioner of the automotive dual air-conditioning system shown in FIG. 1.
Figure 2B:
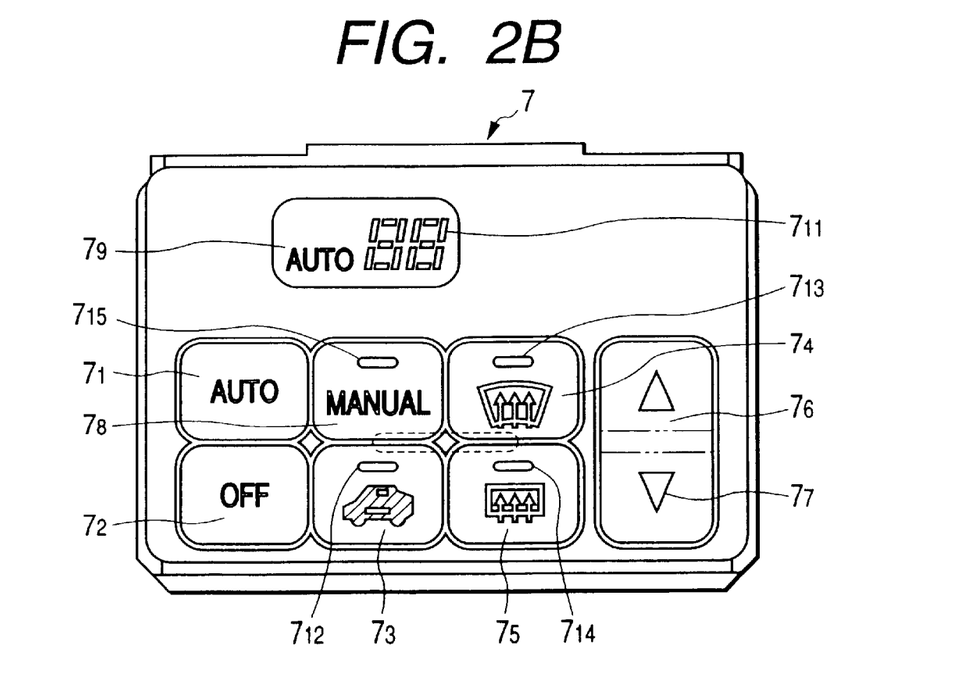
FIG. 2B is an enlarged view of the control panel shown in FIG. 2A.

Next, FIG. 2A is a front view showing the control panel of No. 1 air conditioner 1 mounted on the front panel of the automobile, for use in the automotive dual air-conditioning system shown in FIG. 1. FIG. 2B is an enlarged view of the control panel.

The control panel 7 of No. 1 air conditioner 1, as shown in FIG. 2A, is assembled in the front panel located above the midpoint between the driver's seat and the assistant driver's seat. As shown in FIG. 2B, the control panel 7 has auto set button $7_1$. air-conditioner off button $7_2$, outside/inside air setting button $7_3$, windshield defogger button $7_4$, rear window defogger button $7_4$, rear window defogger button $7_5$, set temperature up button $7_6$, set temperature down button $7_7$, and No. 2 air-conditioner manual setting button $7_8$. Also provided are auto indicator $7_9$. and set temperature indicator $7_{11}$. Furthermore, the control panel 7 has outside/inside air changeover indicator lamp $7_{12}$, windshield defogger setting indicator lamp $7_{13}$, rear window defogger setting indicator lamp $7_{14}$, and No. 2 air conditioner manual setting indicator lamp $7_{15}$.

Figure 3A:
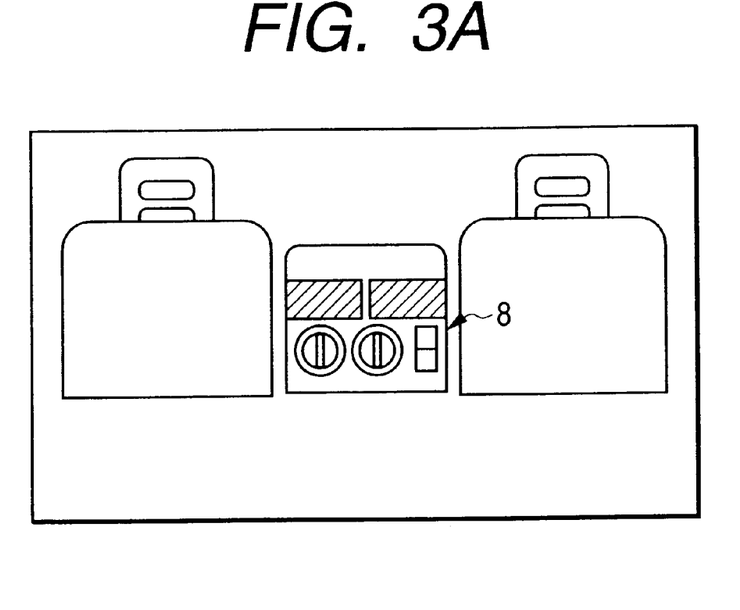
FIG. 3A is a front view showing the front part of the rear seat with the control panel of No. 2 air conditioner of the automotive dual air-conditioning system shown in FIG. 1 mounted on the back of a console box.
Figure 3B:
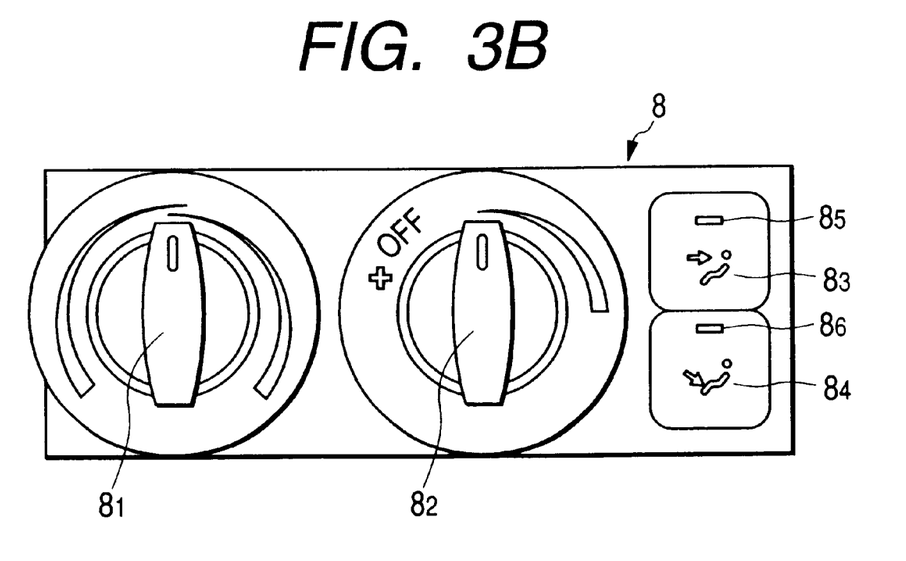
FIG. 3B is an enlarged view of the control panel shown in FIG. 3A.

Next, FIG. 3A is a front view showing the front part of the rear seat with the control panel of No. 2 air conditioner of the automotive dual air-conditioning system shown in FIG. 1 mounted on the back of a console box; and FIG. 3B is an enlarged view showing the control panel section.

The control panel 8 of No. 2 air conditioner 2 is installed on the back of the console box located at the midpoint between the driver's seat and the assistant driver's seat as shown in FIG. 3A. The control panel 8, as shown in FIG. 3B, has a temperature setting control $8_1$, an air volume (blower) setting control $8_2$, a front air outlet setting button $8_3$, a foot air outlet setting button $8_4$, a front air outlet setting indicator lamp $8_5$ and a foot air outlet setting indicator lamp $8_6$. In this case, either of the temperature setting control $8_1$ and the air volume setting control $8_2$ is a rotary type with a knob. A desired control position can be selected by turning the knob.

Figure 4:
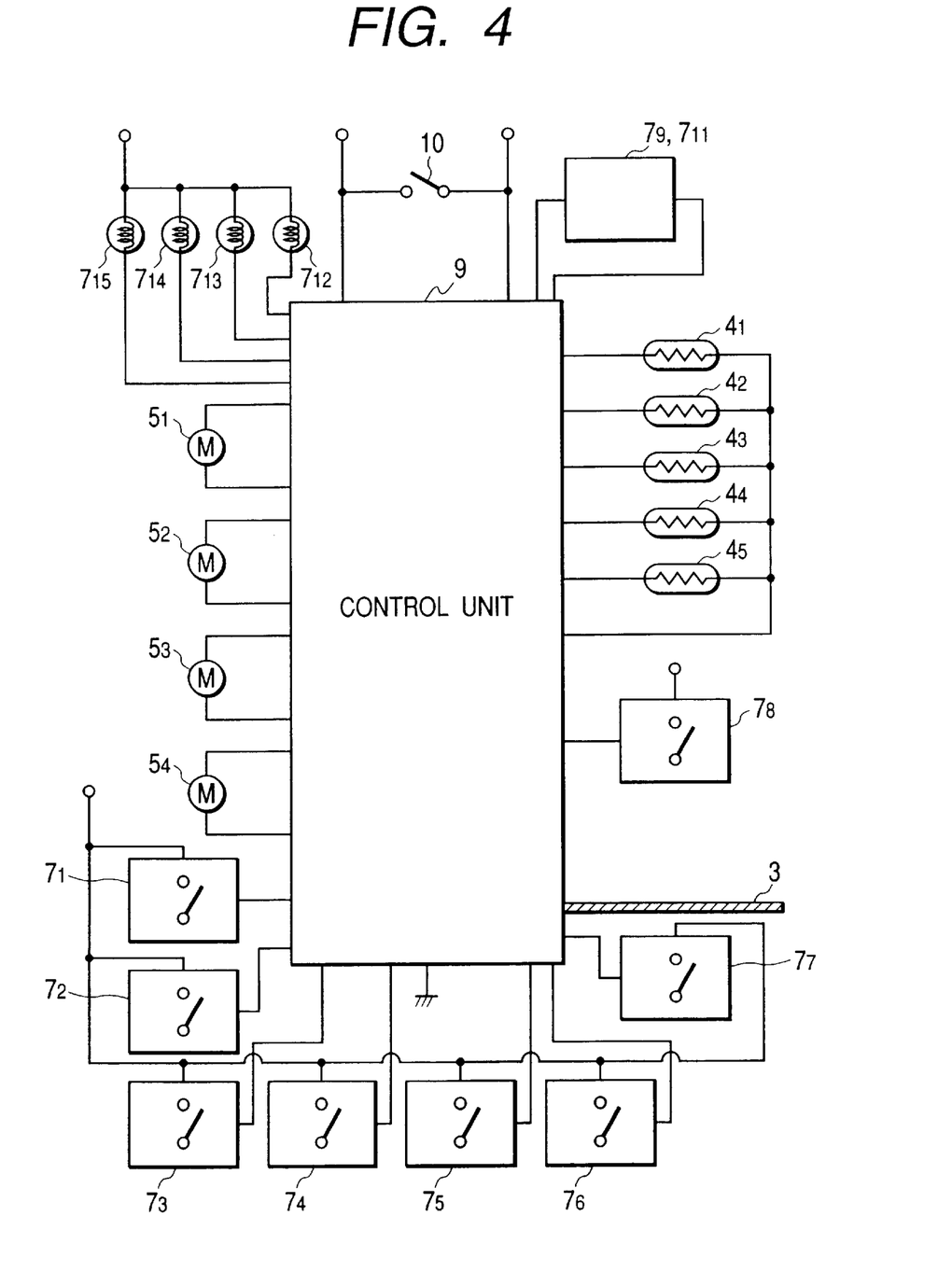
FIG. 4 is a circuit diagram showing the constitution of a major portion of No. 1 air conditioner used in the automotive dual air-conditioning system shown in FIG. 1.
Figure 5:
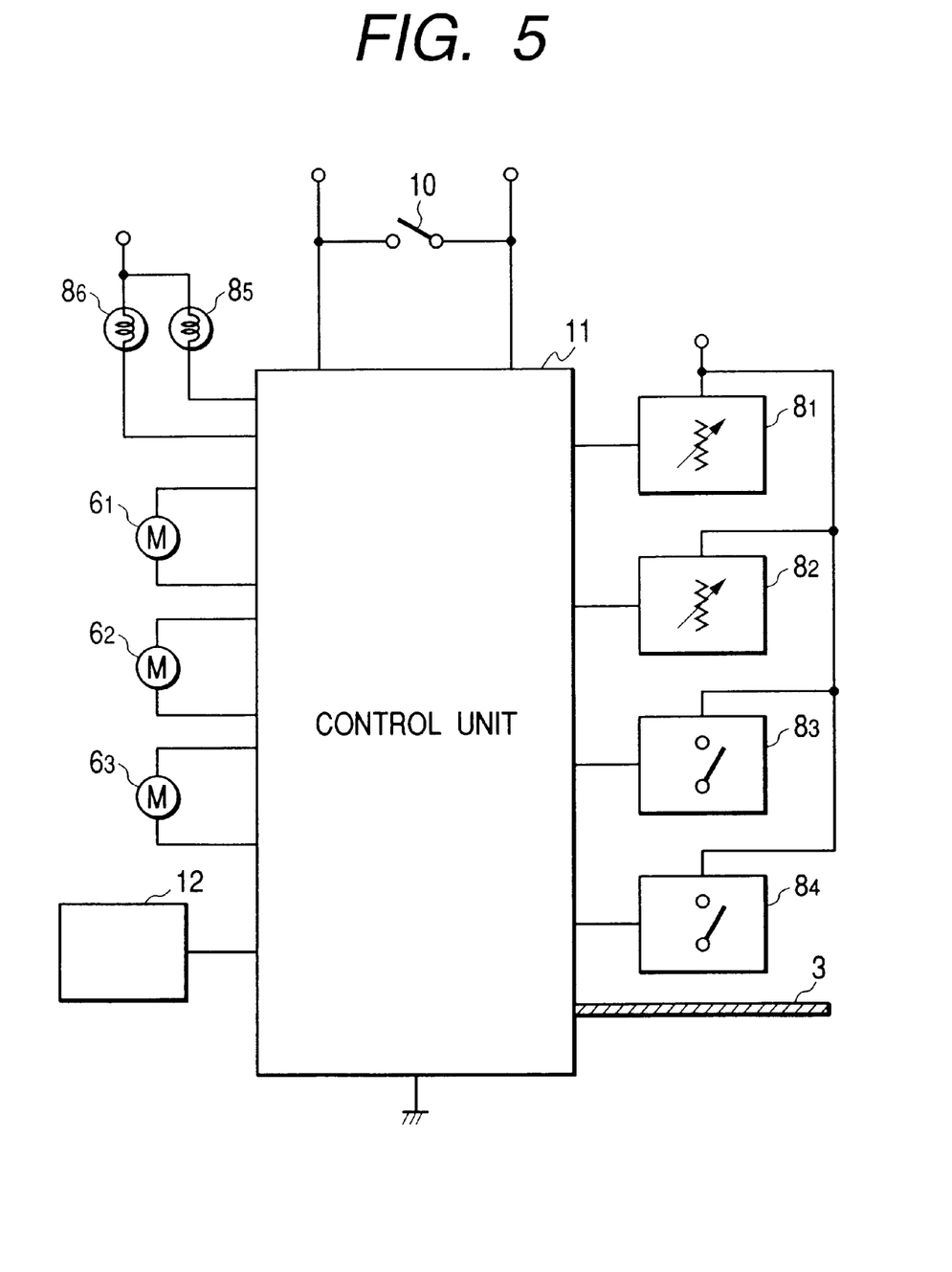
FIG. 5 is a circuit diagram showing the constitution of a major portion of No. 2 air conditioner used in the automotive dual air-conditioning system shown in FIG. 1.

Subsequently, FIG. 4 is a circuit diagram showing the constitution of a major portion of No. 1 air conditioner used in the automotive dual air-conditioning system shown in FIG. 1. FIG. 5 is a circuit diagram showing the constitution of a major portion of No. 2 air conditioner also used in the air-conditioning system.

No. 1 air conditioner 1, as shown in FIG. 4, has a control unit 9. Connected to the control unit 9 are bus line 3, five temperature sensors $4_1$, $4_2$, $4_3$, $4_4$, and $4_5$, and auto setting button $7_1$, air-conditioner off button $7_2$, outside/inside air setting button $7_3$, windshield defogger button $7_4$, rear window defogger button $7_5$, set temperature up button $7_6$, set temperature down button $7_7$, No. 2 air conditioner manual setting button $7_8$, auto indicator $7_9$, set temperature indicator $7_{11}$, outside/inside air changeover indicator lamp $7_{12}$, windshield defogger setting indicator lamp $7_{13}$ rear window defogger setting indicator lamp $7_{14}$, and No. 2 air conditioner manual setting indicator lamp $7_{15}$ as shown in FIG. 2B To the control unit 9 an ignition switch 10 is also connected.

Furthermore, No. 2 air conditioner 2 has a control unit 11 and an air-conditioner control information monitor unit 12 as shown in FIG. 5. The control unit 11, as shown in FIG. 1, is connected with the bus line 3 and three motors $6_1$, $6_2$, and $6_3$. Also as shown in FIG. 3B, temperature setting control $8_1$, air volume setting control $8_2$, front air outlet setting button $8_3$, and foot air outlet setting button $8_4$, front air outlet setting indicator lamp $8_5$, and foot air outlet setting indicator lamp $8_6$ are connected. Furthermore, connected to the control unit 11 are, similarly to No. 1 air conditioner 1, the ignition switch 10 and the air-conditioner control information monitor unit 12.

Figure 6:
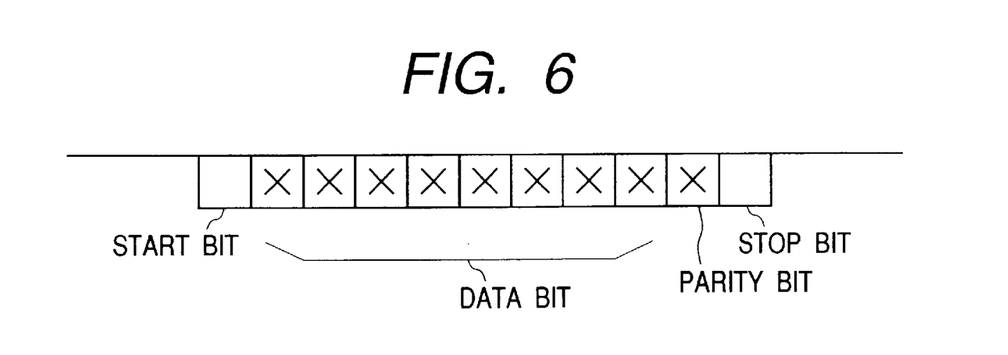
FIG. 6 is a signal waveform chart showing one example of formation of an air-conditioner control information used in the automotive dual air-conditioning system shown in FIG. 1.

Furthermore, FIG. 6 is a signal waveform chart showing one example of formation of an air-conditioner control information used in the automotive dual air-conditioning system shown in FIG. 1.

As shown in FIG. 6, air-conditioner control information transferred and fed from No. 1 air conditioner to No. 2 air conditioner through the bus line 3 is composed of 11 bits in one frame, of which the first bit is a START bit, and the following eight bits, that is, from the second to ninth bits, are DATA bits; the tenth bit is a PARITY bit including an even number of bits; and the eleventh(the last) bit is a STOP bit.

Figure 7:
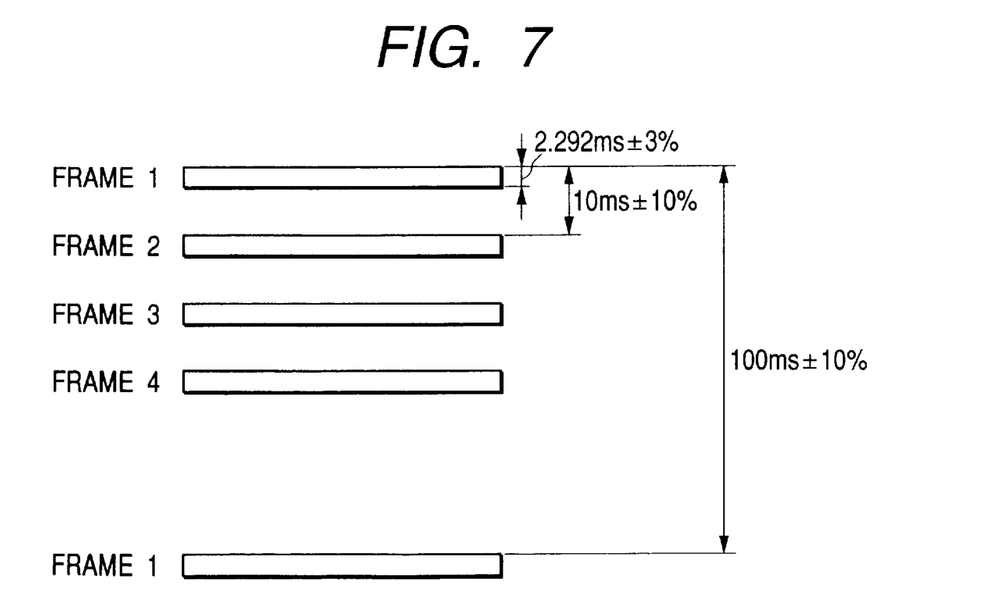
FIG. 7 is a signal formation chart showing one example of frame formation of the air-conditioner control information used in the automotive dual air-conditioning system shown in FIG. 1.

FIG. 7 is a signal formation chart showing one example of frame formation of the air-conditioner control information used in the automotive dual air-conditioning system shown in FIG. 1.

In the case of the information about air-conditioner control to be transferred from No. 1 air conditioner to No. 2 air conditioner through the bus line 3, one unit of signal to be transmitted is composed of four frames each of which contains 11 bits as shown in FIG. 7. Therefore, a data bit including eight bits per frame is insufficient; and a data bit including two frames containing 16 bits is required to set the air volume. In this case, the time required for transfer of one frame per signal transfer unit is set at 2.292 ms±3%; the time interval from the start of one frame till the start of the next one frame is set at 10 ms±10%; and the time interval from the start of one signal transfer unit till the start of the next one signal transfer unit is set at 100 ms±10%.

Operation of the present embodiment of the automotive dual air-conditioning system having the aforesaid constitution will be described below.

When the ignition switch 10 of the automobile is turned on while the power switch (not shown in FIG. 4) of No. 1 air conditioner is in on position, a drive signal is supplied to both of the control unit 9 of No. 1 air conditioner 1 and the control unit 11 of No. 2 air conditioner 2, thereby operating both No. 1 air conditioner 1 and No. 2 air conditioner 2. At this time, controls and adjustments are performed from the control unit 9 of No. 1 air conditioner, to thereby achieve the last condition of control of No. 1 air conditioner 1, that is, the last condition of the air conditioner, corresponding to the set condition used in the last operation of one, or a plurality of, such. buttons located on the control panel 7 as the auto setting button $7_1$. air-conditioner off button $7_2$, outside/inside air setting button $7_3$, windshield defogger button $7_4$, rear window defogger button $7_5$, set temperature up button $7_6$, and set temperature down button $7_7$. At the same time, the control unit 9 produces at a given period the air-conditioner control information for setting the last condition of operation and transfers to supply the air-conditioner control information to the control unit 11 of No. 2 air conditioner through the bus line 3. No. 2 air conditioner 2 is controlled by the control unit 11 in accordance with the air-conditioner control information thus supplied, obtaining the same condition of operation as that of No. 1 air conditioner 1.

Then, when any button on the control panel 7 of No. 1 air conditioner 1 is depressed by the driver in the driver's seat, the control unit 9 detects the operation of the button depressed, and controls each part of No. 1 air conditioner 1 to set the condition of operation to a new condition of operation according to the button operation. At this time, the control unit 9 produces at a given period a new air-conditioner control information for setting the condition of operation corresponding to the operation of the button pressed, transferring the new air-conditioner control information to the control unit 11 of No. 2 air conditioner 2 through the bus line 3. Thus the control unit of No. 2 air conditioner 2 controls to the same new condition of operation as the condition of operation of No. 1 air conditioner 1 in accordance with the new air-conditioner control information thus supplied.

In this case, when the auto setting button $7_1$ on the control panel 7 of No. 1 air conditioner 1 is pressed, the condition of operation of No. 1 air conditioner 1 and No. 2 air conditioner 2 are set to auto for automatically setting to a proper condition of operation. When the air-conditioner off button $7_2$ is pressed with No. 1 and No. 2 air conditioners set in this auto condition, No. 1 air conditioner 1 and No. 2 air conditioner 2 are turned to off. Each time the outside/inside set button $7_3$ is pressed, No. 1 air conditioner 1 is switched alternately from "outside air setting" for taking in the outside air to "inside air setting" for recirculating the inside air or vice versa. When the windshield defogger button $7_4$ is pressed, No. 1 air conditioner 1 blows the air out from under the windshield glass, defogging the windshield glass. Also when the rear window defogger button $7_5$ is pressed, No. 1 air conditioner 1 supplies the electric current to heat up the heat wire in the rear window glass to thereby defogging the rear window glass. Furthermore, each time the set temperature up button $7_6$ is depressed, the set temperature of No. 1 air conditioner 1 and No. 2 air conditioner 2 rises by a given degree of temperature, e.g., by one degree. Also each time the set temperature down button $7_7$ is depressed, the set temperature of No. 1 air conditioner 1 and No. 2 air conditioner 2 drops by a given degree of temperature, e.g., by one degree.

In this case, the air-conditioner control information to be transferred from No. 1 air conditioner 1 to No. 2 air conditioner 2 through the bus line 3, as shown in FIG. 6, contains 11 bits in each frame. As shown in FIG. 7, one signal transfer unit comprises four frames, and the information of this one signal transfer unit is repetitively transferred at a given period of 100 ms±10%.

The above-described operation of No. 1 air conditioner 1 and No. 2 air conditioner 2 was carried out without pressing the No. 2 air-conditioner manual setting button $7_8$ located on the control panel 7 of No. 1 air conditioner. When the No. 2 air-conditioner manual setting button $7_8$ is pressed, a control off information is transmitted from No. 1 air conditioner 1 to No. 2 air conditioner 2 via the bus line 3, thereby releasing No. 2 air conditioner 2 from the air-conditioning control from No. 1 air conditioner 1. Thus the operating condition of No. 2 air conditioner 2 can be separately set by operating the temperature setting control $8_1$, air volume setting control $8_2$, front air outlet setting button $8_3$, and foot air outlet setting button $8_4$ arranged on the control panel 8.

Next, described below is operation of the automotive dual air-conditioning system of the present embodiment in case a trouble has occurred from some cause in one or more points of the bus line 3, a connection between No. 1 air conditioner and the bus line 3, and a connection between No. 2 air conditioner 2 and the bus line 3.

When a trouble has taken place in any one of the bus line 3, the connection between No. 1 air conditioner and the bus line 3, and the connection between No. 2 air conditioner 2 and the bus line 3, the air-conditioner control information to be transferred from No. 1 air conditioner 1 to No. 2 air conditioner through the bus line 3 can be no more properly transferred, being partly or all missing. At this time, the control unit 11 of No. 2 air conditioner 2 is constantly monitoring the condition of receiving the air-conditioner control information transferred from No. 1 air conditioner 1, by using the air-conditioner control information monitor unit 12. The air-conditioner control information monitor unit 12 detects a failure in continuously receiving a normal air-conditioner control information for a specific period of time, e.g., eight seconds, producing communications error information. Upon receiving the communications error information, the control unit 11 starts the same operation as in the case where the control-off information is fed from No. 1 air conditioner 1, enabling individually setting the condition of air-conditioning operation of its own by operating the temperature setting control $8_1$, air volume setting control $8_2$, front air outlet setting button $8_3$, and foot air outlet setting button $8_4$ located on the control panel 8.

The control unit 11 of No. 2 air conditioner 2, when switched to individual setting of operation of No. 2 air conditioner 2, supplies an intermittent drive signal to the front air outlet setting indicator lamp $8_5$ and/or the foot air outlet setting indicator lamp $8_6$, which, therefore, will blink. As the front air outlet setting indicator lamp $8_5$ and/or the foot air outlet setting indicator lamp $8_6$ are blinking, the rear seat occupant can see that the condition of operation of No. 2 air conditioner 2 has been changed over to individual setting without depending on control from No. 1 air conditioner 1. The blinking time of the front air outlet setting indictor lamp $8_5$ and the foot air outlet setting indicator lamp $8_6$ may be either the period of changeover to individual setting of the operating condition of No. 2 air conditioner 2 or a given period after the changeover.

In this case, it is possible to set No. 2 air conditioner 2 to an air temperature corresponding to the knob position by turning the knob of the temperature setting control $8_1$ on the control panel 8. Similarly, it is possible to set the volume of air to be delivered, correspondingly to the knob position, by turning the knob on the air volume setting control $8_2$. Also it is also possible to set the air outlet to the horizontal position to deliver the air to the rear seat occupant by pressing the front air outlet setting button $8_3$ on the control panel 8, and to set the air outlet position to deliver the air from the foot area obliquely upward to the rear seat occupant by pressing the foot air outlet setting button $8_4$.

In the example described above, the air-conditioner control information monitor unit 12 produces communications error information when no normal information about the control of air conditioner has been received for a continuous period of eight seconds. It, however, should be not iced that the point of time when the communications error information is produced is not limited to the continuous period of eight seconds, and may be around eight seconds.

According to the automotive dual air-conditioning system of the present embodiment, in the event of a communications error with the air-conditioner control information to be transferred because of some trouble arising in the air-conditioner control information transfer system of the bus line 3, the control unit 11 of No. 2 air conditioner 2 detects the communications error, changing the operating condition of No. 2 air conditioner 2 over to manual; therefore, in the event of trouble in the air-conditioner control information transfer system, it is possible to prevent a failure in controlling the operating condition of No. 2 air conditioner 2.

According to the present invention, as heretofore described, in case normal air-conditioner control information cannot be transferred to No. 2 air conditioner through the bus line because of trouble in the bus line connected to No. 1 and No. 2 air conditioners, No. 2 air conditioner is instantly changed over to manual control of air-conditioning operation, enabling successive control of No. 2 air conditioner. The present invention, therefore, has such an advantage that there will occur no failure in temperature control inside of the automobile, and accordingly no discomfort will be given to the driver and passengers, either.

What is claimed is:

1. An automotive dual air-conditioning system having No. 1 air conditioner and No. 2 air conditioner arranged separately in an automobile, for controlling air-conditioning operation in the automobile, and a bus line connected between the No. 1 air conditioner and the No. 2 air conditioner; during operation of the No. 1 air conditioner and the No. 2 air conditioner, the No. 1 air conditioner transfers air-conditioner control information to the No. 2 air conditioner through the bus line, to thereby control the operating condition of the No. 2 air conditioner in accordance with the information thus supplied; and the No. 2 air conditioner changes the control of its operating condition to manual control in case a communication error of air-conditioner control information to be transferred through the bus line continues over a specific period of time.

2. An automotive dual air-conditioning system according to claim 1, wherein the No. 1 air conditioner is located at the front part in the automobile, while the No. 2 air conditioner is located at the rear part in the automobile.

3. An automotive dual air-conditioning system according to claim 1, wherein a light-emitting device arranged on a control panel of the No. 2 air conditioner blinks in case a communication error of air-conditioner control information continues over a specific period of time.

* * * * *